US012403581B2

(12) United States Patent
Scheel et al.

(10) Patent No.: US 12,403,581 B2
(45) Date of Patent: Sep. 2, 2025

(54) HANDHELD WORK APPARATUS WHICH IS PORTABLE IN USE

(71) Applicant: Andreas Stihl AG & Co. KG, Waiblingen (DE)

(72) Inventors: Alexander Scheel, Schwaebisch Gmuend (DE); Martin Kuhn, Pluederhausen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/623,648

(22) Filed: Apr. 1, 2024

(65) Prior Publication Data

US 2024/0326224 A1 Oct. 3, 2024

(30) Foreign Application Priority Data

Mar. 31, 2023 (DE) ..................... 10 2023 108 332.5
Jul. 24, 2023 (DE) ..................... 10 2023 119 516.6

(51) Int. Cl.
*B25F 5/02* (2006.01)

(52) U.S. Cl.
CPC .................................... *B25F 5/02* (2013.01)

(58) Field of Classification Search
CPC ........................................................ B25F 5/02
See application file for complete search history.

(56) References Cited

U.S. PATENT DOCUMENTS

2005/0058890 A1* 3/2005 Brazell .................. B25F 5/006 429/97
2010/0218967 A1 9/2010 Rosskamp et al.
2010/0224666 A1* 9/2010 Miyata .................... B25F 5/006 227/120
2018/0102576 A1* 4/2018 Yamamoto ........ H01M 10/6556
2018/0193995 A1* 7/2018 Runau ........................ B25F 5/02
2020/0227927 A1* 7/2020 Thiele ................... H04W 4/029
2021/0265607 A1* 8/2021 Bosscher .............. H01M 50/24
2021/0283758 A1* 9/2021 Furusawa ................. B25F 5/02
2021/0384579 A1* 12/2021 Holubarsch ......... H01M 50/242
2022/0176511 A1 6/2022 Greitmann et al.
(Continued)

FOREIGN PATENT DOCUMENTS

CN 103402710 A * 11/2013 ................ B25F 5/02
DE 10 2009 012 175 A1 9/2010
(Continued)

*Primary Examiner* — Lucas E. A. Palmer
(74) *Attorney, Agent, or Firm* — Walter Ottesen, P.A.

(57) ABSTRACT

A portable handheld work apparatus includes a tool, an electric motor, a battery as power source for the electric motor, and a housing with a battery shaft for receiving the battery. The battery shaft has a removal opening delimited by an edge. An end face of the battery is delimited in the direction radially with respect to the removal direction by an edge region. The edge of the removal opening projects beyond the edge region of the end face of the battery. The work apparatus has a normal state, wherein the battery is removable from the battery shaft through the removal opening. The work apparatus has a temporary impact state which can occur in an impact of the housing onto an impact surface. A capture element is arranged in the region of the edge of the removal opening and, in the normal state, permits a removal of the battery.

21 Claims, 8 Drawing Sheets

(56) References Cited

U.S. PATENT DOCUMENTS

| | | | | |
|---|---|---|---|---|
| 2022/0332389 | A1* | 10/2022 | Braedt | ..................... B62J 43/13 |
| 2024/0001526 | A1 | 1/2024 | Meuer et al. | |
| 2024/0051109 | A1 | 2/2024 | Greitmann et al. | |

FOREIGN PATENT DOCUMENTS

| | | | | | |
|---|---|---|---|---|---|
| DE | 10 2013 223 814 | A1 | | 5/2015 | |
| DE | 10 2021 105 540 | A1 | | 9/2021 | |
| DE | 102022123059 | A1 | * | 3/2024 | |
| EP | 3 733 352 | A1 | | 11/2020 | |
| EP | 4 008 478 | A1 | | 6/2022 | |
| EP | 4 008 491 | A1 | | 6/2022 | |
| EP | 3772394 | B1 | * | 6/2023 | ................ B25F 5/02 |
| WO | WO-2024051895 | A1 | * | 3/2024 | |

* cited by examiner

HANDHELD WORK APPARATUS WHICH IS PORTABLE IN USE

CROSS-REFERENCE TO RELATED APPLICATIONS

This application claims priority of German patent application nos. 10 2023 108 332.5, filed Mar. 31, 2023, and 10 2023 119 516.6, filed Jul. 24, 2023, the entire contents of which are incorporated herein by reference.

TECHNICAL FIELD

The disclosure relates to a handheld work apparatus which is portable in use. The handheld work apparatus includes a tool, an electric motor for driving the tool, a battery as a power source for the electric motor and a housing with a battery shaft for receiving the battery.

BACKGROUND

In the case of impact of a handheld work apparatus which is portable in use of this type on an impact surface, in particular after a gravity-induced fall of the handheld work apparatus which is portable in use, the housing with the battery shaft is braked abruptly while the battery continues to move in the fall direction on account of its mass inertia. The relative forces which occur in the process are to be absorbed, with the result that the battery remains in the battery shaft and does not slip out of it even in the case of a fall from a great height of, for example, 1 m or 1.5 m. The configuration of the locking element and the housing such that it holds the battery reliably in the battery shaft even in the case of an impact of the housing of the work apparatus is complex and expensive.

SUMMARY

An object of the disclosure is to develop a handheld work apparatus which is portable in use in such a way that the battery is held reliably in the battery shaft in the case of an impact and the work apparatus can be produced in a simple way and inexpensively.

This object is, for example, achieved by way of a handheld work apparatus which is portable in use including: a tool; an electric motor for driving the tool; a battery for supplying power to the electric motor; a housing defining a battery shaft for receiving the battery; the battery shaft having a removal opening delimited by an edge; the battery being delimited by an end face in a removal direction of the battery in a state wherein the battery is received into the battery shaft; the end face being delimited, in a direction radially with respect to the removal direction, at least partially by an edge region of the end face; the edge of the removal opening projecting in the removal direction beyond the edge region of the end face of the battery received in the battery shaft; the work apparatus having a normal state wherein the battery is removable from the battery shaft in the removal direction through the removal opening; the work apparatus having a temporary impact state which can occur in response to an impact of the housing onto an impact surface; the work apparatus further including a capture element; the capture element being arranged in a region of the edge of the removal opening; wherein, in the normal state, the capture element is configured to permit removal of the battery from the battery shaft; and, the housing being configured to elastically deform so as to cause, in the impact state of the work apparatus, the capture element to prevent a movement of the battery out of the battery shaft because of the elastic deformation of the housing.

According to the disclosure, the work apparatus has a normal state. In the normal state, the battery can be removed in the removal direction from the battery shaft through the removal opening. Furthermore, the work apparatus has a temporary impact state. The temporary impact state can be present in the case of an impact of the housing on an impact surface. In particular, the temporary impact state can be present in the case of an impact of the housing after a gravity-induced fall from a certain height. This certain height can be, in particular, at least 0.5 m, in particular at least 0.9 m, in particular at least 1.5 m. The certain height can be delimited, in particular, to at most 2 m, in particular at most 1.2 m. The disclosure provides that the work apparatus includes a capture element. The capture element is arranged in the region of the edge of the removal opening. The work apparatus is configured in such a way that the capture element permits a removal of the battery from the battery shaft in the normal state of the work apparatus. The housing of the work apparatus can be deformed elastically in such a way that the capture element prevents a movement of the battery out of the battery shaft in the impact state of the work apparatus on account of an elastic deformation of the housing.

As a result, the battery is at least also held by way of the capture element in the battery shaft in the temporary impact state. This reliably ensures that the battery remains in the battery shaft even in the case of an impact of the housing on an impact surface. This is ensured inexpensively in a simple way by way of the capture element.

The capture element is advantageously configured via at least one part of the edge of the removal opening of the battery shaft of the housing. In the normal state of the work apparatus, the capture element preferably projects in the direction transversely, in particular perpendicularly, with respect to the removal direction beyond the base body of the battery shaft in the direction of the battery which is received in the battery shaft. As a result, the capture element can be produced in a particularly simple way. To this end, a separate element preferably does not have to be fastened to the housing, but rather the housing itself can configure the capture element. In particular, the capture element is configured with the housing such that they are formed from the same material. The capture element is expediently produced together with the housing in the same injection molding method step.

It is provided in a development of the disclosure, in particular, that, in the normal state of the work apparatus, the edge of the removal opening has a normal contour as viewed in the direction counter to the removal direction. By way of the normal contour, the battery can be removed with its end face at the front from the battery shaft through the removal opening in the removal direction. In particular, in the temporary impact state, the removal opening has an impact contour as viewed in the direction counter to the removal direction. The impact contour is preferably such that a movement of the battery in the direction of the removal opening is prevented on account of the impact contour of the edge of the removal opening. In particular, the normal contour of the removal opening is transferred into the impact contour by way of elastic deformation of the housing. In particular, this takes place during an impact of the housing on the impact surface, preferably during an exclusively gravity-induced fall from a certain height.

In the impact state, the battery has an outer battery contour as viewed in the direction counter to the removal direction. In particular, the outer battery contour intersects the impact contour of the edge of the removal opening in a view in the direction counter to the removal direction. This prevents the battery fitting through the removal opening in the impact state. The impact contour of the edge of the battery advantageously has at least one diameter which, in a view in the direction counter to the removal opening, is smaller than the diameter of the outer battery contour measured at the same location in a view in the direction counter to the removal opening. In particular, the outer battery contour and the impact contour overlap in the impact state in a view in the direction counter to the removal opening. A movement of the battery in the direction out of the battery shaft is prevented by way of contact of the battery with the edge of the removal opening.

The work apparatus is advantageously configured such that, in the impact state, the capture element clamps in the battery. The work apparatus is advantageously configured such that, in the impact state of the work apparatus, the capture element clamps in the battery at suitable defined locations, in particular the housing of the battery. In particular, in the impact state of the work apparatus, the capture element holds the battery in the battery shaft in a positively locking manner. The force of the battery which arises during the impact of the work apparatus as a result of the acceleration of the battery can be conducted in a simple way into the housing and absorbed there by way of the battery being clamped in, or the positively locking connection between the capture element and the battery.

In particular, the capture element is part of an outer wall of the housing. As a result, particularly simple manufacture of the capture element and the work apparatus is possible.

In particular, the capture element is a rib of the housing, which rib runs at least partially around the removal opening and projects in the direction of the removal opening. In particular, the rib runs around the removal opening in a not necessarily contiguous angular range of in total at least 270°. As a result, the force of the battery can be introduced into the housing in a particularly uniform and gentle manner.

In particular, the work apparatus has a locking element for releasable fastening of the battery in the battery shaft. In the temporary impact state, the battery is preferably held in the battery shaft both by the locking element and by the capture element. Therefore, lower requirements can be made of the strength and elasticity both of the capture element and of the locking element. This makes simple and inexpensive production of the work apparatus possible. As a result, the force of the accelerated battery can be absorbed by a plurality of components, namely both by the locking element and by the capture element. This also makes a uniform and gentle distribution of the force which is introduced by the battery into the housing possible.

In particular, in the temporary impact state, the battery bears with its edge region against the capture element. As a result, a movement of the battery out of the battery shaft can be stopped in a simple way.

In particular, the work apparatus falls in a fall direction before the impact with an impact surface in the temporary impact state. In particular, the removal direction runs obliquely with respect to the fall direction and the removal opening points at least partially in the fall direction. In particular, the removal direction has a vector component in the direction of the fall direction which is not equal to zero. On account of this relative orientation of the removal direction and the fall direction with respect to one another, there would be the possibility, without securing by way of, for example, a locking element for releasable fastening of the battery, that the battery slides out of the battery shaft in the case of the impact on the impact surface.

In particular, the work apparatus is configured such that the battery moves in the direction of the removal opening in the case of the impact on the impact surface. The housing is expediently deformed elastically in the case of the impact on the impact surface, in such a way that the capture element prevents the movement of the battery in the then prevailing temporary impact state of the work apparatus.

In an embodiment, the work apparatus includes a friction arrangement. The friction arrangement is expediently arranged in the battery shaft in such a way that, in the case of the impact of the housing on the impact surface, the battery can slide on the friction arrangement in the direction of the capture element. The friction apparatus is advantageously arranged in the battery compartment in such a way that, in the case of the impact of the housing on the impact surface, the battery can introduce forces into the housing via the friction arrangement, in particular at the same time while the battery slides on the friction arrangement. In particular, the introduction of the forces of the battery from the battery via the friction arrangement into the housing takes place by way of friction. As a result, kinetic energy of the battery can already be output to the housing before the contact between the battery and the capture element. As a result, the battery can already be braked at least partially on the path in the direction of the capture element. As a result, the capture element can be configured to absorb a smaller overall force. As a result, the capture element can be produced inexpensively. As a result, the capture element can be of smaller dimensions.

In the normal state of the work apparatus, the friction arrangement is expediently at the smallest radial spacing, measured perpendicularly with respect to the removal direction, from the battery at that location of the brake arrangement which is at the greatest spacing, measured in the removal direction, from the capture element. As a result, the first contact between the friction arrangement and the battery can arise at a great distance from the capture element. As a result, a transfer of power with maximum efficiency is possible from the battery to the friction arrangement. The battery can output its kinetic energy over as long a path as possible in the direction of the capture element to the friction arrangement.

The friction arrangement expediently runs at least partially around the removal opening. It can be provided that the friction arrangement extends around the removal direction, in particular around the removal opening, at least in a not necessarily contiguous angular range of at least 270°. The friction arrangement expediently runs completely around the removal opening, in particular around the removal direction. As a result, a particularly satisfactory transfer of energy from the battery via the friction arrangement to the housing is possible. As a result, a uniform introduction of the force of the battery into the housing is made possible.

The friction arrangement is arranged at a friction arrangement spacing, measured in the removal direction, from the capture element. In the normal state, the edge region of the end face of the battery is arranged at a battery spacing, measured in the removal direction, from the capture element. The friction arrangement spacing is expediently greater than the battery spacing. This ensures that the positively locking connection which prevents the movement of the battery out of the battery shaft takes place between the battery and the capture element and not between the friction arrangement and the battery.

The battery has a battery length which is measured in the removal direction in the normal state. The friction arrangement has a friction arrangement length which is measured in the removal direction in the normal state. It is provided in one advantageous development of the disclosure that the friction arrangement length is at least 10% of the battery length. As a result, the kinetic energy of the battery can be output to the friction arrangement over a sufficiently great distance.

In the normal state, the brake arrangement is expediently arranged with regard to the removal direction in the half part which lies closest to the removal opening. In the normal state, the friction arrangement is preferably arranged with regard to the removal direction in that third of the battery which lies closest to the removal opening. As a result, the friction arrangement already starts in an upper part of the battery and, starting from there, can act over a great length of the battery. As a result, a satisfactory brake action of the friction arrangement is possible.

In an embodiment of the disclosure, the friction arrangement includes at least two, in particular at least three, support ribs which are spaced apart from one another in the removal direction. As a result, the friction arrangement can be produced particularly simply and inexpensively.

In the normal state, the at least two support ribs advantageously project in the direction transversely with respect to the removal direction, in particular in the direction perpendicularly with respect to the removal direction, beyond the base body of the battery shaft in the direction of the battery which is received in the battery shaft. Before the impact state is present, the at least two support ribs can be bent over in the removal direction elastically at least some way, and can thus absorb kinetic energy of the battery and introduce it into the housing. As a result of this configuration of the friction arrangement, the friction arrangement can be produced particularly inexpensively and efficiently.

It is provided in an embodiment of the disclosure that, in the region of the friction arrangement, the housing has a plurality of reinforcing ribs for absorbing the forces which are transmitted from the friction arrangement to the housing. As a result, the forces of the battery can be introduced via the friction arrangement uniformly and gently into the housing.

In particular, the reinforcing ribs run from the friction arrangement in the direction of an impact region on the outer side of the housing. In particular, the impact region delimits the housing in the fall direction. As a result, the energy can be conducted in a simple way from the battery shaft to the outer wall of the housing. In this way, the kinetic energy of the battery can be transmitted uniformly and gently to the housing of the work apparatus.

It is provided, in particular, that the housing, in particular the outer wall of the housing, is free from reinforcing ribs in the region of the capture element, with the result that an elastic deformation of the housing is possible in the region of the capture element. As a result, it is made possible in a simple way that, in the impact state of the work apparatus, the capture element prevents a movement of the battery out of the battery shaft on account of an elastic deformation of the housing.

BRIEF DESCRIPTION OF DRAWINGS

The invention will now be described with reference to the drawings wherein.

DETAILED DESCRIPTION

Figure 1:
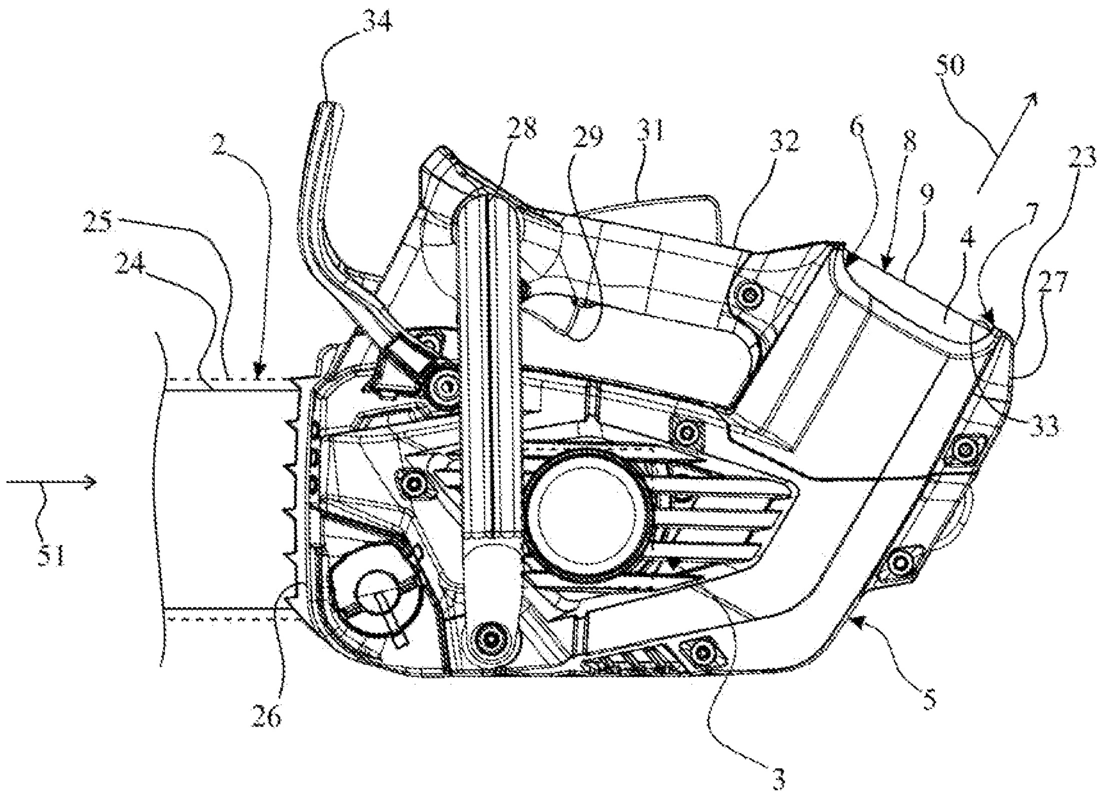
FIG. 1 shows a diagrammatic side view of a handheld work apparatus which is portable in use and is configured as a motorized chainsaw for tree care.
Figure 10:
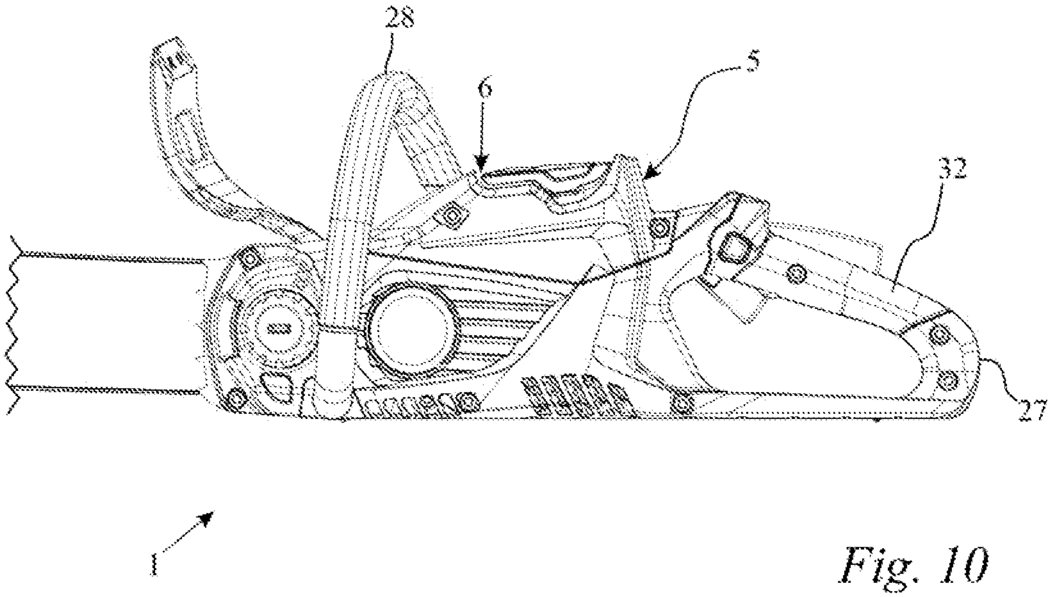
FIG. 10 shows a diagrammatic side view of a handheld work apparatus which is portable in use and is configured as a rear-handle motorized chainsaw.
Figure 11:
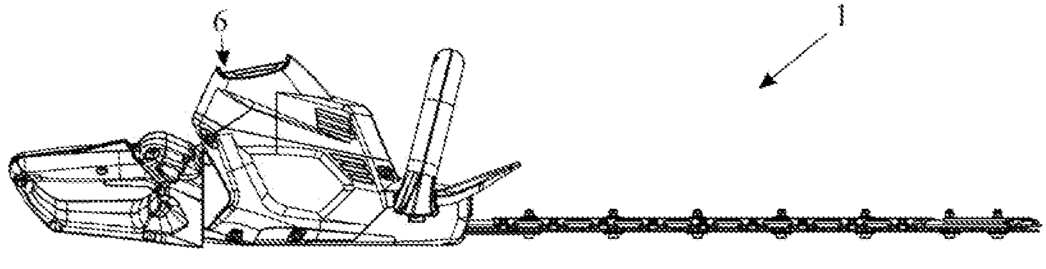
FIG. 11 shows a diagrammatic side view of a handheld work apparatus which is portable in use and is configured as a hedge trimmer; and, FIG. 12 shows a diagrammatic side view of a handheld work apparatus which is portable in use and is configured as a brushcutter.
Figure 12:
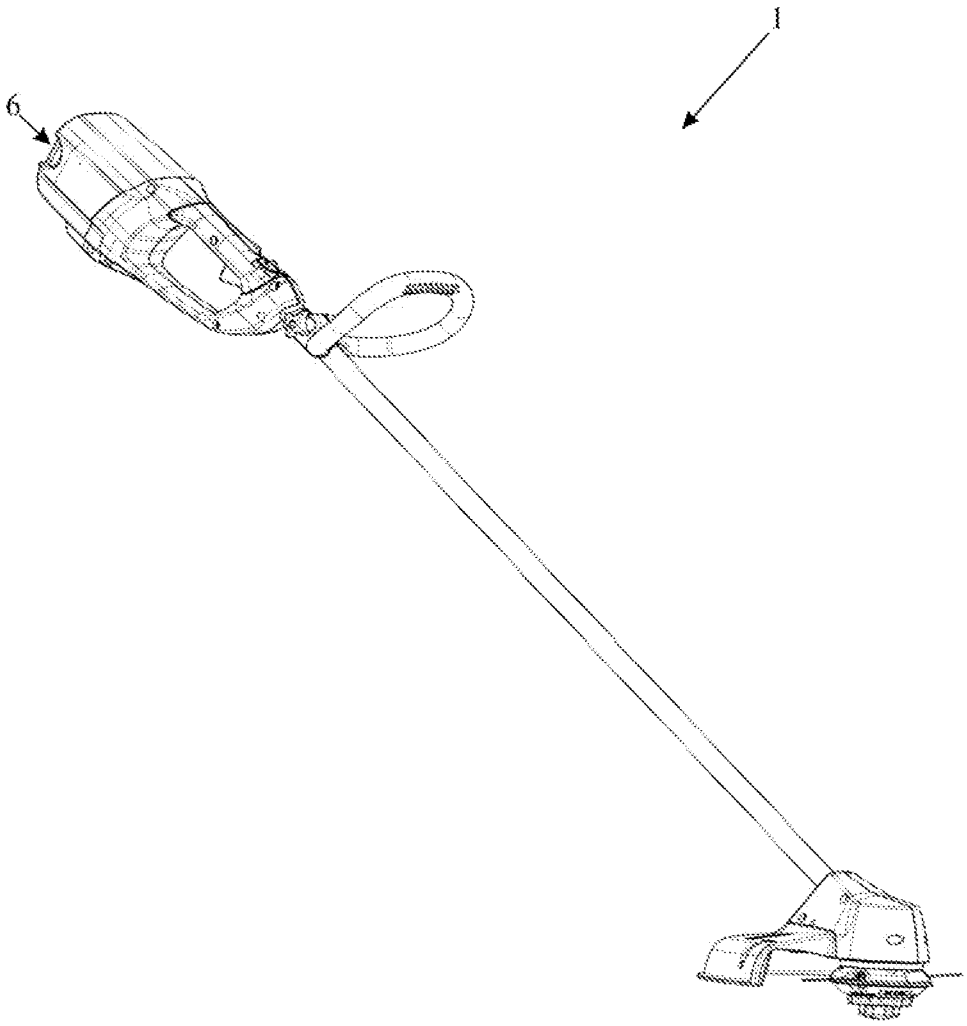

FIG. 1 shows a work apparatus 1. The work apparatus 1 is handheld. The work apparatus 1 is portable in use. During correct operation of the work apparatus 1, the work apparatus 1 is carried by the user. In the embodiment according to FIG. 1, the work apparatus 1 is a motorized chainsaw for tree care. A motorized chainsaw of this type is also called a “top-handle” motorized chainsaw. The handheld work apparatus which is portable in use can also be, however, any other work apparatus which is portable in use. FIGS. 10 to 12 show a “rear-handle” motorized chainsaw (FIG. 10, also called a standard motorized chainsaw), a motorized hedge trimmer (FIG. 11) and a brushcutter (FIG. 12) as further embodiments for handheld work apparatuses 1 according to the disclosure which are portable in use.

The work apparatus 1 which is shown in FIG. 1 includes a housing 5. An electric motor 3 is arranged in the housing 5. The electric motor 3 is shown diagrammatically in FIG. 1 by way of a dashed square. The electric motor 3 serves to drive a tool 2. The electric motor 3 is supplied with electric power by a battery 4. The battery is also called a battery pack. A plurality of batteries can also be provided.

As shown in FIG. 1, the housing 5 extends from a front end 26 as far as a back end 27. The merely diagrammatically shown tool 2 is arranged at the front end 26 of the housing 5. The tool 2 is configured as a saw chain 25. The saw chain 25 runs around a guide bar 24 during operation. The saw chain 25 is driven in a circulating manner around the guide bar 24 by the electric motor 3 via a drive element. The drive element is not shown in greater detail. The drive element is driven rotationally by the electric motor 3. In the embodiment, the drive element is a chain sprocket (not shown in greater detail). The chain sprocket drives the saw chain 25 during operation. The guide bar 24 is arranged at the front end 26 of the housing 5 and extends, starting from the front end 26, in the direction from the back end 27 of the housing 5 to the front end 27 of the housing 5. The guide bar 24 protrudes beyond the housing 2 at the front end 26 of the housing 2.

As shown in FIG. 1, the work apparatus 1 includes a rear handle 32. The rear handle 32 is configured on the housing 5. The rear handle 32 is assigned an operator controlled element 29 and a further operator controlled element 31. In the embodiment, the operator controlled element 29 is configured as an operating lever. The further operator controlled element 31 serves as a holding element, by way of which a locking device (not shown) can be held in an unlocking position in a comfortable way. In the embodiment, the further operator controlled element 31 is configured as a lever. The further operator controlled element 31 is connected operatively to the operator controlled element 29. In one alternative embodiment, the further operator controlled element 31 can also be configured as a mechanical locking device and can bring about mechanical locking of the operator controlled element 29. Via the operator controlled element 29, the electric motor can be put into operation. In particular, the electric motor 3 can be actuated via the operator controlled element 29. In particular, the rotational speed of the electric motor 3 can be controlled via the operator controlled element 29.

In the embodiment, the rear handle 32 is arranged on an upper side of the work apparatus 1. In one alternative embodiment of the work apparatus 1, it is configured as "rear-handle" motorized chainsaw, as shown in FIG. 10. In this alternative variant, the rear handle 32 is arranged at the rear longitudinal end of the housing. This rear-handle motorized chainsaw has a standard handle. In this rear-handle embodiment, the rear handle 32 forms the back end 27 of the housing 5.

The work apparatus 1 includes a front handle 28 which is shown in FIG. 1. The front handle 28 adjoins, in particular, the rear handle 32. During operation of the work apparatus 1, the rear handle 32 faces the user. The front handle 28 faces away from the user. The front handle 28 is likewise arranged on the upper side of the work apparatus 1. In the alternative embodiment according to FIG. 10, the front handle 28 is configured as a handle bracket. The handle bracket is also called a bale handle. In this rear-handle embodiment, the front handle 28 reaches over the housing 5 from one longitudinal side over the upper side as far as the other longitudinal side of the housing 5.

As shown in FIG. 1, a hand guard 34 is mounted in front of the front handle 28. In the embodiment, the hand guard 34 is configured as a bracket. The hand guard 34 is fastened pivotably to the housing 5. The hand guard 34 serves as a trigger for a brake device (not shown in greater detail) of the work apparatus 1. The brake device of the work apparatus 1 serves to brake the tool 2.

The battery which is shown in FIG. 1 serves as power source for the electric motor 3. The battery 4 is held exchangeably in the housing 5 of the work apparatus 1. The housing 5 has a battery shaft 6. The battery shaft 6 serves to receive the battery 4. The battery shaft 6 is configured by way of the housing 5. The battery shaft 6 is a depression in the outer wall of the housing 5. The battery shaft 6 opens toward the upper side of the work apparatus 1. The battery shaft 6 has a removal opening 8. The battery 4 can be removed from the battery shaft 6 in the removal direction 50 through the removal opening 8. The removal opening 8 is delimited by an edge 7. The edge 7 runs around the removal direction 50.

Figure 3:
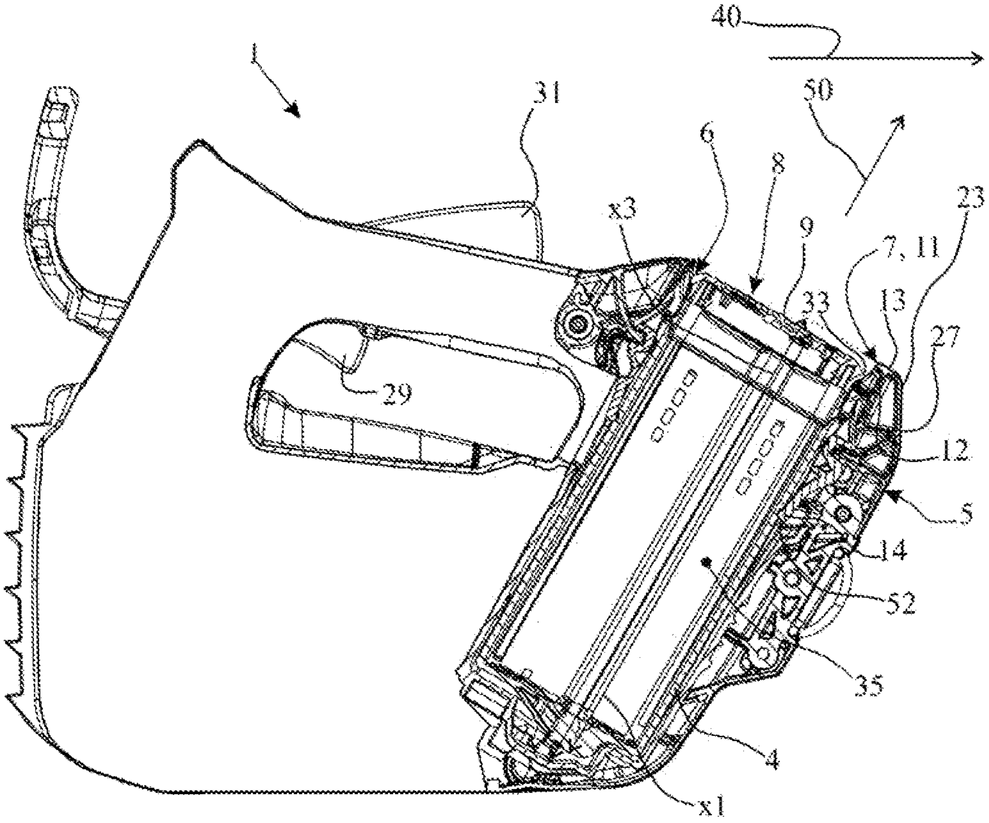
FIG. 3 shows a sectional illustration of a section through the work apparatus from FIG. 2 along the sectional line III-III shown in FIG. 2, but with a battery inserted into the battery shaft.
Figure 4:
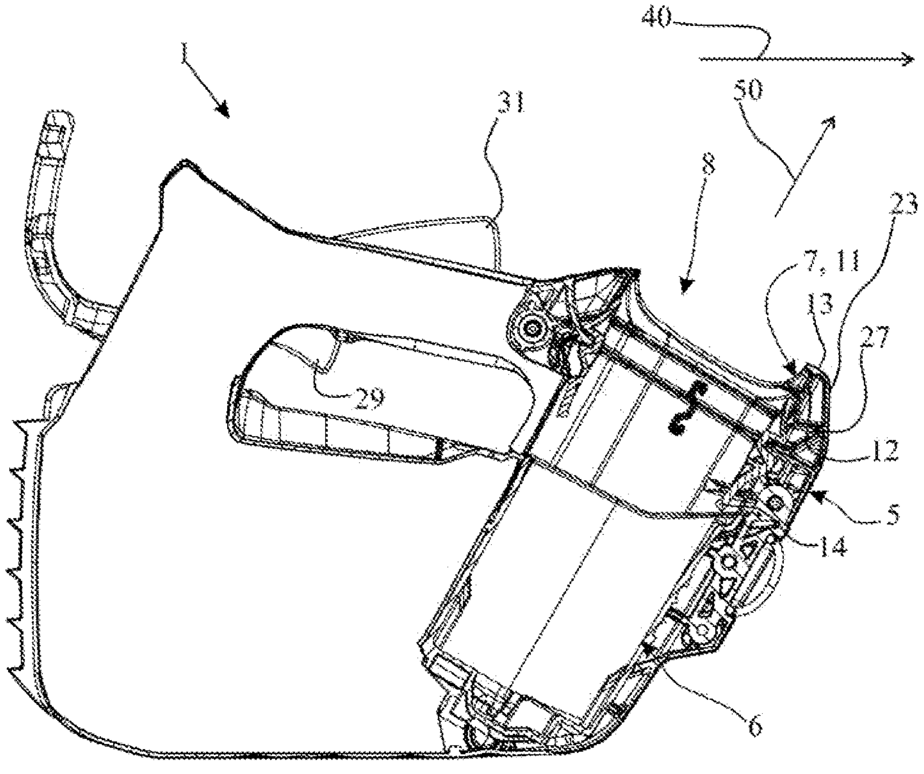
FIG. 4 shows the sectional illustration from FIG. 3, but without a battery inserted into the battery shaft.

The battery 4 has a peripheral outer wall 35 which is shown in FIG. 3. The peripheral outer wall 35 of the battery 4 runs in a closed manner around the removal direction 50 in that state of the battery 4 in which it is received into the battery shaft 6. In the embodiment, the removal direction 50 corresponds to a longitudinal direction of the battery 4 in that state of the battery 4 in which it is received into the battery shaft 6. In that state of the battery 4 in which it is received into the battery shaft 6, the peripheral outer wall 35 of the battery 4 is arranged completely in the battery shaft 6.

In the state in which it is received into the battery shaft 6, the battery 4 is delimited in the removal direction 50 of the battery 4 by way of an end face 9. In particular, the peripheral outer wall 35 is delimited in the removal direction 50 by the end face 9 in that state of the battery 4 in which it is received into the battery shaft 6. The end face 9 has an edge region 33. The edge region 33 extends, in particular, at the edge of the end face 9. The edge region 33 lies on the end face 9 radially on the outside with regard to the removal direction 50. In that state of the battery 4 in which it is received into the battery shaft 6, the edge region 33 of the end face 9 runs at least partially, preferably in a closed manner, around the removal direction 50. The end face 9 is delimited in the direction radially with respect to the removal direction 50 by the edge region 33. The edge region 33 is arranged, in particular, at the transition between the end face 9 and the peripheral outer wall 35.

The edge 7 of the removal opening 8 projects beyond the edge region 33 of the end face 9 of the battery 4 which is received into the battery shaft 6. In other words: in that state of the battery 4 in which it is received into the battery shaft 6, the edge region 33 is at a spacing from the edge 7 of the removal opening 8 of the battery shaft 6. The edge region 33 of the end face 9 of the battery 4 can also extend only over a small angular range with regard to the removal direction 50. In the embodiment, however, the angular range is 360°. In that state of the battery 4 which is received into the battery shaft 6, the edge region 33 of the end face 9 is arranged completely within the battery shaft 6.

Figure 6:
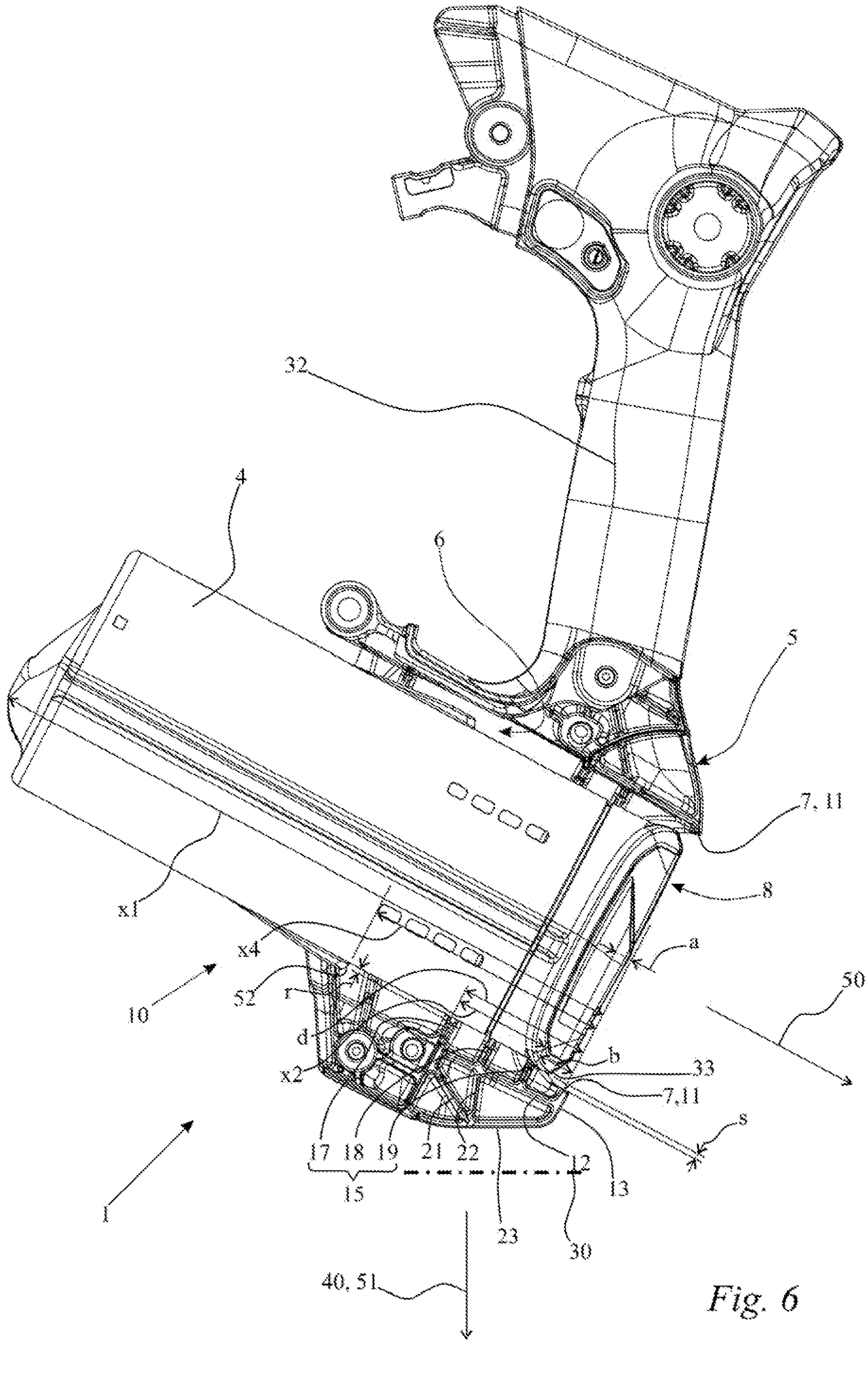
FIG. 6 shows a diagrammatic, partially sectioned illustration of the housing of the work apparatus from FIGS. 1 to 5 in the region of the battery shaft with a battery received in the battery shaft, in the normal state of the work apparatus.

The work apparatus 1 has a normal state 10. The normal state 10 of the work apparatus 1 is shown in FIG. 6 in a partially sectioned illustration of the work apparatus 1. In the normal state 10, the battery 4 is situated in the state in which it is received into the battery shaft 6. In the normal state 10, the battery 4 can be removed in the removal direction 50 from the battery shaft 6 through the removal opening 8. In the normal state 10 of the work apparatus 1, the edge 7 of the removal opening 8 of the battery shaft 6 has a normal contour 49 as viewed in the direction counter to the removal direction 50. The normal contour 49 is shown diagrammatically in FIG. 8. In the normal state 10 of the work apparatus 1, the battery 4 can be removed with its end face 9 at the front through the removal opening 8 in the removal direction 50 from the battery shaft 6. The battery 4 has an outer battery contour 47 as viewed in the direction counter to the longitudinal direction of the battery 4. In the normal state 10 of the work apparatus 1, the longitudinal direction of the battery 4 and the removal direction of the battery 4 run in the same direction. In the normal state 10 of the work apparatus 1, the outer battery contour 47 lies completely within the normal contour 49 of the edge 7 of the battery shaft 6 as viewed in the direction counter to the removal direction 50. As viewed in the direction counter to the removal direction

50, a gap is configured between the battery 4 and the edge 7 of the battery shaft 6 in the normal state 10 of the work apparatus 1.

As shown in FIG. 3, the work apparatus 1 includes a locking element 14. The locking element 14 serves to releasably fasten the battery 4 in the battery shaft 6. In the embodiment according to FIG. 3, the locking element 14 is configured as a locking lever. The locking element 14 is prestressed, in particular, by a spring in the direction of the battery 4. In order to fasten the battery 4 in the battery shaft 6, the locking element 14 engages into a corresponding counter contour 52 on the peripheral side of the battery 4. In the case of a movement of the battery 4 out of the battery shaft 6, the battery 4 comes into contact with the locking element 14, in particular by way of its counter contour 52. The locking element 14 is mounted pivotably on the housing 5 of the work apparatus 1 in the embodiment. In that state of the battery 4 in which it is received into the battery shaft 6, the battery 4 in the embodiment is held in the battery shaft 6 by the locking element 14. For a removal of the battery 4 out of the battery shaft 6 in the removal direction 50, the work apparatus 1 has to be situated in the normal state 10. As a further precondition for the removal of the battery 4 from the battery shaft 6 in the normal state 10 of the work apparatus 1, the locking element 14 has to be released. To this end, the locking element 14 is pivoted such that it no longer engages into the corresponding counter contour 52 on the battery 4. The battery 4 can then be removed through the removal opening 8 of the battery shaft 6 out of the battery shaft 6 in the normal state 10. In the embodiment, the counter contour 52 for the locking element 14 on the battery 4 is of elevated configuration on the battery housing. In one alternative embodiment, the counter contour 52 can also be provided in a depressed manner in the housing of the battery 4.

Figure 7:
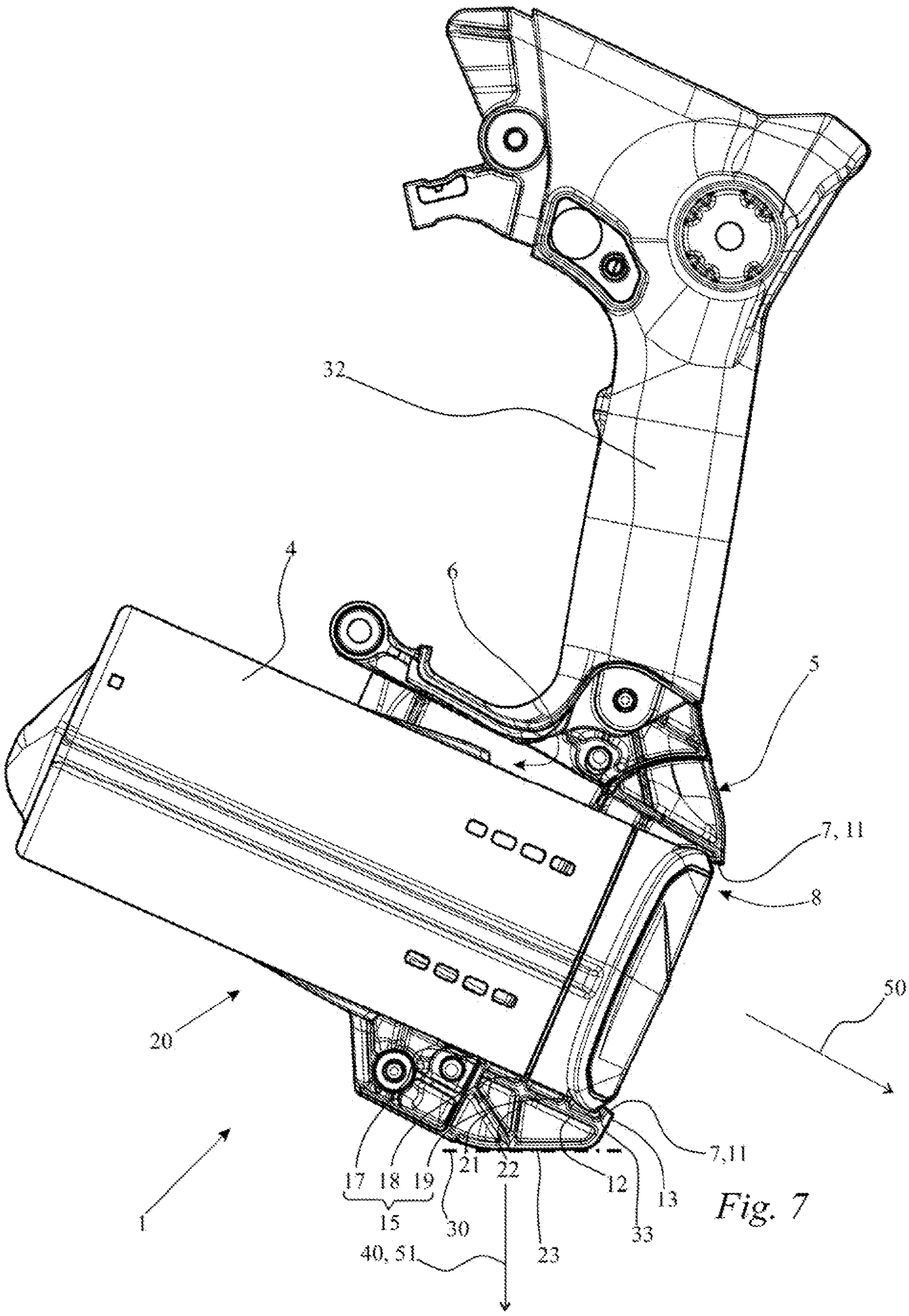
FIG. 7 shows the illustration from FIG. 6, but in the impact state of the work apparatus.

The work apparatus 1 has a temporary impact state 20 which is shown in FIG. 7 in the partial section of the work apparatus 1. The temporary impact state 20 can be present in the case of the impact of the housing 5 on an impact surface 30. The work apparatus 1 includes a capture element 11. The capture element 11 is arranged in the region of the edge 7 of the removal opening 8. As shown in FIG. 6, the capture element 11 permits a removal of the battery 4 from the battery shaft 6 in the normal state 10 of the work apparatus 1. The housing 5 can be deformed elastically in such a way that the capture element 11 prevents a movement of the battery 4 out of the battery shaft 6 on account of an elastic deformation of the housing 5 in the impact state 20 (shown in FIG. 7) of the work apparatus 1.

Figure 9:
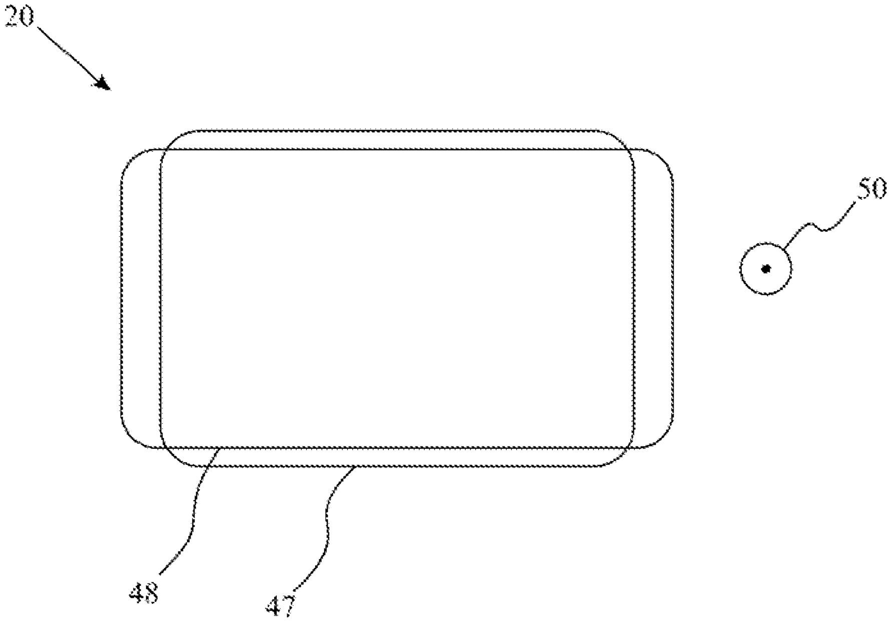
FIG. 9 shows a diagrammatic illustration of an impact contour of the removal opening of the battery shaft from FIG. 7 and the outer battery contour of the battery.

As shown diagrammatically in FIG. 9, in the temporary impact state 20, the removal opening 8 has an impact contour 48 as viewed in the direction counter to the removal direction 50. The impact contour 48 is such that a movement of the battery 4 in the direction of the removal opening 8 is prevented on account of the impact contour 48 of the edge 7 of the removal opening 8. In the temporary impact state 20, the outer battery contour 47 of the battery 4 intersects the impact contour 48 of the edge 7 of the removal opening 8. In the case of the impact of the work apparatus 1, the contour of the edge 7 of the removal opening 8 can be transferred from the normal contour 49 into the impact contour 48. As a consequence, the battery 4 no longer fits through the contour of the edge 7 of the removal opening 8 with its outer battery contour 47 in the temporary impact state 20. As a result, slipping of the battery 4 out of the battery shaft 6 is prevented.

The normal state 10 of the work apparatus 1 is present during normal operation of the work apparatus 1. The work apparatus 1 can be transferred from the normal state 10 into the temporary impact state 20 only in the case of a corresponding action of force on the housing 5. The corresponding action of force has to act in a certain region of the work apparatus 1 and has to exceed a certain minimum magnitude. An impact region 23 is illustrated in FIG. 1, onto which the housing 5 typically impacts when the temporary impact state 20 is present. The work apparatus 1 then typically falls with the back end 27 of the housing 5 at the front onto an impact surface 30. The impact surface 30 is shown in FIGS. 6 and 7. The work apparatus 1 has a longitudinal direction 51 which is illustrated in FIG. 1. The longitudinal direction 51 extends in the direction from the front end 26 toward the back end 27 of the housing 5. The longitudinal direction 51 corresponds to a longitudinal direction of the guide bar 24. In the case of a free fall of the work apparatus 1, the work apparatus 1 falls in a fall direction 40 which is illustrated in FIGS. 6 and 7. On account of the position of the center of gravity of the work apparatus 1, the work apparatus 1 falls with the back end 27 of the housing 5 at the front in free fall. The longitudinal direction 51 of the work apparatus 1 then runs in the direction of the fall direction 40. In the case of impact onto the horizontal impact surface 30, the work apparatus 1 impacts with its impact region 23 onto the horizontal impact surface 30. The impact region 23 can be deformed elastically at least partially. In the case of a fall of the work apparatus 1 from a minimum fall height of 0.1 m, in particular of 1 m, the counter force which acts on account of the weight of the work apparatus 1 in the case of the impact of the work apparatus 1 on the impact surface 30 is sufficient to transfer the work apparatus 1 from the normal state 10 into the temporary impact state 20. At the same time, the counter force which is brought about in the process is small enough to avoid a plastic deformation of the housing 5. The minimum fall height is also called the certain height. The work apparatus 1 is configured in such a way that the temporary impact state 20 is achieved in the case of a fall of the work apparatus 1 from a minimum fall height of from 0.5 m to 2 m, in particular of from 0.9 m to 1.2 m. Here, merely an elastic and no plastic deformation of the housing 5 is brought about, in particular in the impact region 23. The weight of the work apparatus 1, the position of the center of gravity of the housing 5, the elasticity of the housing 5 and the relative positioning of the capture element 11 and the battery 4 in the normal state 10 of the work apparatus are adapted to one another such that, in the case of a fall from a height of from 0.5 m and 2 m, in particular of from 0.9 m to 1.2 m, a transition from the normal state 10 of the work apparatus 1 into the temporary impact state 20 of the work apparatus 1 is brought about. After the fall process from the indicated height range is ended, when the work apparatus 1 is no longer moving, the work apparatus 1 returns again into the normal state 10. The housing 5 is then no longer deformed.

As shown in FIG. 6, the capture element 11 is arranged at a capture element spacing s from the edge region 33 of the battery 4 in the normal state 10 of the work apparatus 1. The capture element spacing s is measured in the direction radially with respect to the removal direction 50. In the embodiment, the capture element spacing s is measured in a plane which is defined by the removal direction 50 and the longitudinal direction 51 of the work apparatus 1. The capture element spacing s is, in particular, at most 5 mm, expediently at most 3 mm, preferably at most 1.5 mm, preferably at most 1.2 mm. The capture element spacing s is, in particular, at least 0.2 mm, expediently at least 0.5 mm, preferably at least 0.8 mm.

FIG. 6 likewise shows that the capture element 11 is at the counter contour spacing x4 from the counter contour 52 of the battery 4 in the normal state 10 of the work apparatus 1. The counter contour spacing x4 is measured in the removal direction 50. The counter contour spacing x4 is, in particular, at least 50 mm, preferably at least 55 mm. The counter contour spacing x4 is, in particular, at most 80 mm, expediently at most 70 mm, preferably at most 65 mm. The capture element spacing s is expediently from 0.1% to 10%, in particular from 0.5% to 5%, preferably from 1% to 2% of the counter contour spacing x4. As a result of this ratio of the capture element spacing s from the counter contour spacing x4, an elastically deformable configuration of the housing 5 is possible in a simple way such that, in the impact state 20 of the work apparatus 1, the capture element 11 prevents the movement of the battery 4 out of the battery shaft 6 on account of the elastic deformation of the housing 5.

As shown in FIG. 1, the battery shaft 6 is arranged in the back half (with regard to the longitudinal direction 51 of the work apparatus 1) of the housing 5. The back half of the housing 5 extends, starting from the rear end 27 of the housing 5, as far as the middle of the housing 5. The battery shaft 6 is arranged in the region of the back end 27 of the housing 5. In the embodiment according to FIG. 1, the battery shaft 6 is arranged between the back end 27 of the housing 5 and the rear handle 32 of the work apparatus 1 with regard to the longitudinal direction 51 of the work apparatus 1. As FIGS. 10 to 12 show, in particular, the battery shaft 6 can also be arranged at a different location of the work apparatus 1, however. For example, the battery shaft 6 can be arranged between the front handle 28 and the rear handle 32. As shown in FIG. 1, in the embodiment according to FIG. 1, the impact region 23 of the housing 5 is at a spacing, measured in the longitudinal direction 51 of the work apparatus 1, from the edge 7 of the removal opening 8 of the battery shaft 6, which spacing is less than 30%, in particular less than 20%, preferably less than 10% of a length, measured in the longitudinal direction 51 of the work apparatus 1, of the housing 5. As a result, the counter force which acts in the case of impact of the work apparatus 1 on the housing 5 can particularly simply bring about an elastic deformation of the housing 5 in such a way that, in the impact state 20 of the work apparatus 1, the capture element 11 prevents a movement of the battery 4 out of the battery shaft 6.

The housing 5 is made from plastic. The housing 5 is elastic in the impact region 23, in particular in the region of the capture element 11 shown in FIG. 7. The housing 5 is produced in an injection molding method. The housing 5 includes at least two injection molding mold parts. The two injection molding mold parts bear against one another along a parting plane. The parting plane runs, in particular, in the longitudinal direction 51 of the work apparatus 1 and in the removal direction 50 of the battery 4.

Figure 2:
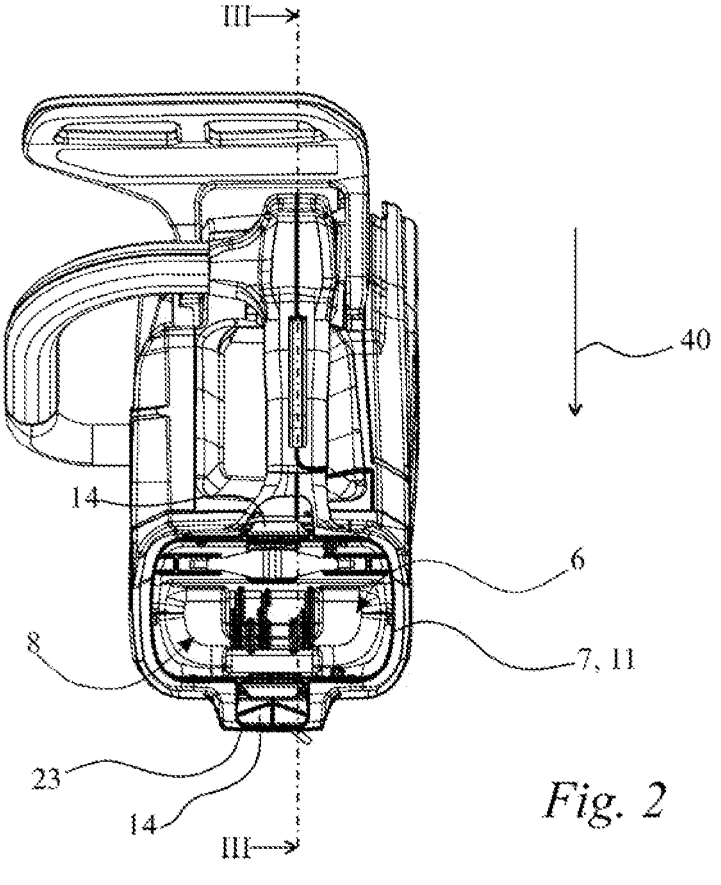
FIG. 2 shows a diagrammatic view from above of the work apparatus from FIG. 1, but without a battery.

As shown in FIG. 7, the capture element 11 is configured by way of at least one part of the edge 7 of the removal opening 8 of the battery shaft 6 of the housing 5. It can be seen in FIG. 2 that the capture element 11 runs virtually completely around the removal opening 8 of the battery shaft 6. The capture element 11 runs in an angular range of at least 270° around the removal direction 50. Here, merely two cutouts for the two locking elements 14 are provided. The two locking elements 14 lie opposite one another with regard to the removal opening 8.

As shown in FIG. 6, in the normal state 10 of the work apparatus 1, the capture element 11 projects in the direction transversely (in the embodiment, perpendicularly) with respect to the removal direction 50 beyond the base body 12 of the battery shaft 6 in the direction of the battery which is received in the battery shaft 6. The base body 12 of the battery shaft 6 extends in the removal direction 50. The base body 12 of the battery shaft 6 runs around the removal direction 50. The base body 12 of the battery shaft 6 encloses the removal direction 50. The capture element 11 is substantially hook-shaped, in particular in a section through the work apparatus along a sectional plane defined by the removal direction 50 and the longitudinal direction 51 of the work apparatus 1.

As shown in FIG. 7, the capture element 11 receives the battery 4 in a positively locking manner in the temporary impact state 20. In the temporary impact state 20, the battery 4 comes into contact with the capture element 11. In the temporary impact state 20, the battery 4 bears with its edge region 33 against the capture element 11. The edge region 33 of the end face 9 of the battery 4 is also called the bearing region. In the temporary impact state 20, the bearing region of the battery 4 bears against the capture element 11. As can be seen in FIGS. 6 and 7, the edge region 33 of the battery 4 runs obliquely with respect to the removal direction 50. It is shown in FIG. 6, in particular, that the spacing of the edge region 33 from the capture element 11 in the normal state 10 increases, starting from a central longitudinal axis of the battery 4, in the direction radially with respect to the removal direction 50. As a result of the oblique configuration of the edge region 33 of the end face 9, the positively locking connection between the battery 4 and the capture element 11 can be established reliably. In the case of a movement of the battery 4 out of the battery shaft 6 during an impact, the battery 4 threads in itself as it were into the capture element 11. This is facilitated by the oblique course of the edge region 33.

Figure 8:
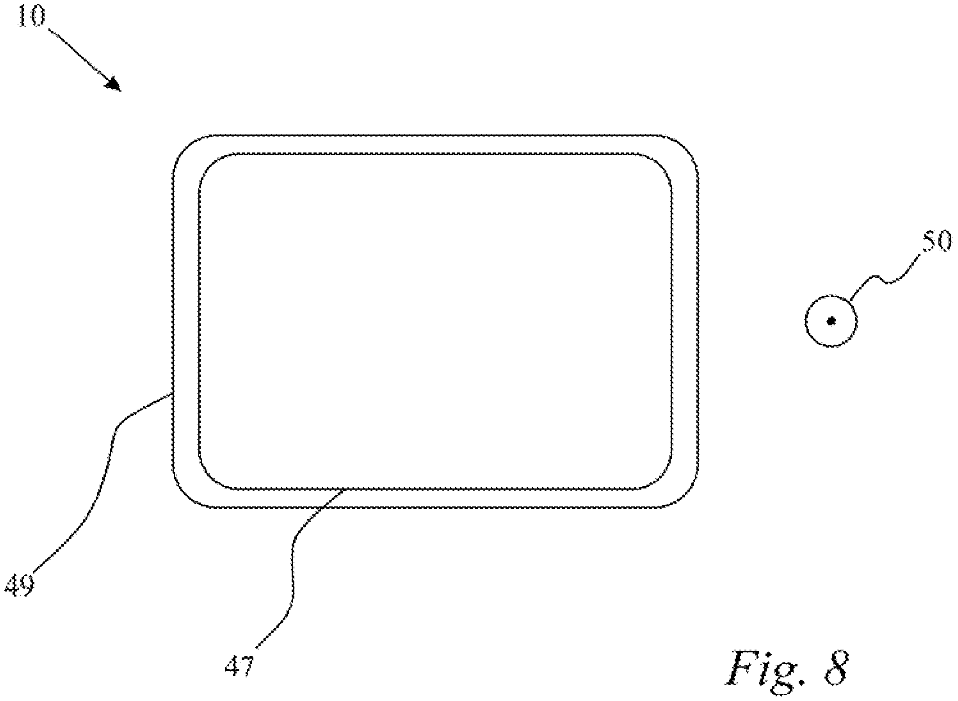
FIG. 8 shows a diagrammatic illustration of a normal contour of the removal opening of the battery shaft from FIG. 6 and the outer battery contour of the battery.

In the temporary impact state 20, a diameter of the removal opening 8, or the contour of the edge 7 of the removal opening 8, is reduced in comparison with the normal state, as shown in FIGS. 8 and 9.

In the temporary impact state 20, the base body 12 of the battery shaft 6, in particular the capture element 11, clamp the battery 4 in. Part pieces of the base body 12 of the battery shaft which lie opposite one another, in particular of the edge 7 of the removal opening 8 of the battery shaft 6, or parts of the capture element 11 which lie opposite one another, are moved toward one another in the temporary impact state 20 in such a way that they clamp in the battery 4.

As shown in FIGS. 6 and 7, the capture element 11 is part of an outer wall 13 of the housing 5. The capture element 11 is formed by a rib of the housing 5. The capture element 11 runs at least partially around the removal opening 8. The capture element 11 projects in the direction of the removal opening 8.

As shown in FIG. 6, the work apparatus 1 is configured in such a way that, in the case of a free fall of the work apparatus 1, the removal direction 50 runs obliquely with respect to the fall direction 40, and the removal opening 8 points at least partially in the fall direction 40. This is the case, in particular, before the impact on an impact surface 30, that is, before the temporary impact state 20 is present. The removal opening 8 points at least partially in the fall direction 40 in such a way that the battery 4 might slide out of the battery shaft 6 if it were not secured by the locking element 14 in the battery shaft 6. The work apparatus 1 is configured in such a way that the battery 4 moves in the direction of the removal opening 8 in the case of the impact on the impact surface 30. As shown in FIG. 7, the work apparatus 1 is configured in such a way that the housing 5 is deformed elastically in the case of the impact on the impact surface 30, in such a way that the capture element 11 prevents the movement of the battery 4 in the then prevailing temporary impact state 20 of the work apparatus 1.

As shown in FIGS. 6 and 7, the work apparatus 1 includes a friction arrangement 15. The friction arrangement 15 is arranged in the battery shaft 6 such that, in the case of the elastic deformation of the housing 5 in the case of an impact of the housing in the described form, the friction arrangement 15 bears at least partially, in particular completely against the battery 4. This can also be the case, in particular, before the impact state 20 is reached. The friction arrangement 15 is arranged in the battery shaft 6 such that, in the case of the impact of the housing 5 on the impact surface 30, the battery 4 can slide on the friction arrangement 15 in the direction of the capture element. The work apparatus 1 is configured such that the kinetic energy of the battery 4 can be absorbed at least partially by the friction arrangement 15 during the sliding on the friction apparatus 15, and can be introduced into the housing 5. As a result, in the case of the impact of the housing 5 on the impact surface 30, the battery 4 can be braked at least partially by the friction arrangement 15. The kinetic energy of the battery 4 to be absorbed by the capture element 11 is reduced before the battery 4 comes into contact with the capture element 11 as a result.

In the normal state 10 of the work apparatus 1, the battery 4 is preferably free from contact by the friction arrangement 15. In the normal state 10 of the work apparatus 1, the friction arrangement 15 is at a smallest radial spacing r, measured perpendicularly with respect to the removal direction 50, from the battery 4. The smallest radial spacing r, measured perpendicularly with respect to the removal direction 50, is present at a location 16 of the friction arrangement 15. That location 16 of the friction arrangement 15 which is at the smallest radial spacing r from the battery 4 is at the greatest spacing d, measured in the removal direction 50, from the capture element 11 in the embodiment.

Figure 5:
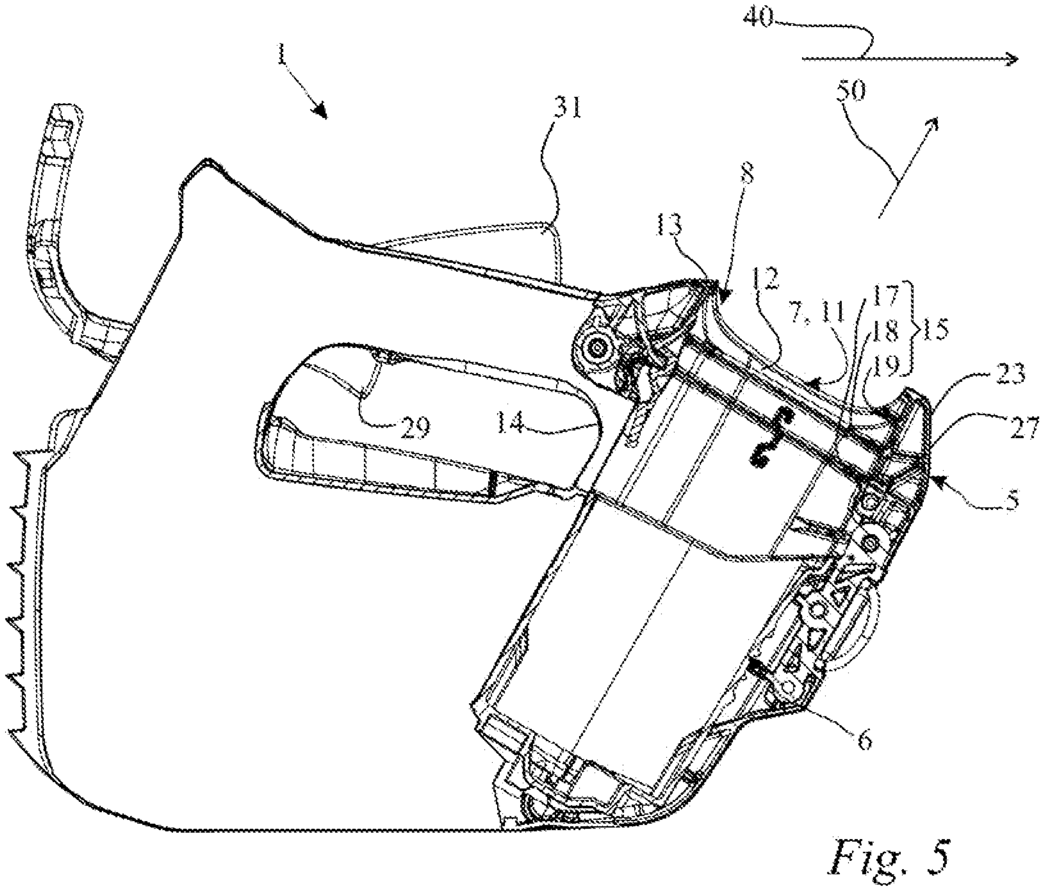
FIG. 5 shows the sectional illustration from FIG. 4, but with merely one instead of two locking elements.

The friction arrangement 15 runs at least partially, in particular completely around the removal opening 8, as shown in FIG. 5.

As shown in FIG. 6, in the normal state 10 of the work apparatus 1, the friction arrangement 15 is at a friction arrangement spacing b, measured in the removal direction 50, from the capture element 11. In the normal state 10 of the work apparatus 1, the edge region 33 of the end face 9 of the battery 4 is at a battery spacing a, measured in the removal direction 50, from the capture element 11. The battery spacing a is measured starting from that region of the edge region 33 of the battery 4 which bears against the capture element 11 in the temporary impact state 20. The friction arrangement spacing b is greater than the battery spacing a. In the embodiment, the friction arrangement spacing b is at least twice the battery spacing a.

In the normal state 10 of the work apparatus 1, the battery 4 has a battery length x1 which is measured in the removal direction 50. In the normal state 10 of the work apparatus 1, the friction arrangement 15 has a friction arrangement length x2 which is measured in the removal direction 50. The friction arrangement length x2 is at least 10% of the battery length x1. As shown in FIG. 3, in the normal state 10 of the work apparatus 1, the battery shaft 6 has a battery shaft length x3 which is measured in the removal direction 50. The battery shaft length x3 is, in particular, greater than the battery length x1.

As shown in FIG. 6, in the normal state 10 of the work apparatus 1, the friction arrangement 15 is arranged with regard to the removal direction 50 in that half part, in particular in that third part of the battery 4, which lies closest to the removal direction 8.

The friction arrangement 15 includes, in particular, at least two (in the embodiment, at least three) support ribs 17, 18 and 19 which are spaced apart from one another in the removal direction 50. In the normal state 10 of the work apparatus 1, the at least two support ribs 17, 18 and 19 project in the direction transversely (in the embodiment, perpendicularly) with respect to the removal direction 50 beyond the base body 12 of the battery shaft 6 in the direction of the battery 4 which is received in the battery shaft 6. The support ribs are configured in one part with the housing 5 of the work apparatus 1. The support ribs 17, 18 and 19 are configured with the housing 5 of the work apparatus 1 in a manner which is formed from the same material. The support ribs 17, 18 and 19 are produced in the same injection molding method step as the housing itself. The support ribs 17, 18 and 19 are a constituent part of the housing 5. In one alternative embodiment, it can be provided that the support ribs 17, 18 and 19 are produced as a two-component or multiple-component part, in particular in a two-component or multiple-component injection molding method. As a result, the effect of energy absorption can be reinforced.

As shown in FIG. 7, the housing 5 has, in particular, a plurality of reinforcing ribs 21, 22 in the region of the friction arrangement 15. The reinforcing ribs 21, 22 serve to absorb the forces, transmitted from the friction arrangement 15 to the housing 5, into the housing. The plurality of reinforcing ribs 21, 22 are arranged between the friction arrangement 15 and the impact region 23 of the housing 5. The plurality of reinforcing ribs 21, 22 run from the friction arrangement 15 in the direction of the impact region 23. The impact region 23 is arranged on the outer side of the housing 5. The impact region 23 delimits the housing 5 in the full direction 40. The reinforcing ribs 21, 22 are arranged substantially in the full direction 40 within the friction arrangement 15. In the temporary impact state 20, the region in the direction perpendicularly with respect to the fall direction 40 (or in the direction perpendicularly with respect to the longitudinal direction 51 of the work apparatus 1) between the friction arrangement 15 and the capture element 11 and in the fall direction 40 (or in the longitudinal direction 51 of the work apparatus 1) between the base body 12 of the battery shaft 6 and an outer wall 13 of the housing 5 is free from reinforcing ribs. The housing 5, in particular the outer wall 13 of the housing 5, is free from reinforcing ribs in the region of the capture element 11, with the result that the elastic deformation of the housing 5 is possible in the region of the capture element 11.

The reinforcing ribs 21, 22 run in a substantially V-shaped manner, in particular, in a sectional plane which is defined by the longitudinal direction 51 and the removal direction 50. The reinforcing ribs 21 and 22 converge in a linear region of the impact region 23 of the housing 5. Starting from this linear region, the force which acts on the impact region 23 in the case of the impact can be introduced into the housing 5. In the embodiment, the reinforcing ribs 21 and 22 extend in the direction perpendicularly with respect to the removal direction 50 and perpendicularly with respect to the longitudinal direction 51 of the work apparatus 1 over at least 90% of the width, measured in the same direction, of the housing 5. It can also be provided that the reinforcing ribs 21 and 22 extend over the entire width of the housing 5 in this region. The ribs are plate-shaped. The ribs lie perpendicularly at least on one part of the housing outer wall 13. The wall thickness of the ribs corresponds to at least the wall thickness of the housing outer wall 13. The thickness of the reinforcing ribs 21 and 22 is greater than that of the ribs of the friction arrangement 15. The ribs of the friction arrangement 15 have, in particular, a thickness which is smaller than the wall thickness of the outer wall 13 of the housing 5.

If the operator of the handheld work apparatus 1 which is portable in use allows the work apparatus 1 to fall at a minimum height which is sufficient for the elastic deformation, the work apparatus will first of all rotate on account of its center of gravity such that it falls with the impact region 23 at the front downward in the fall direction 40. During the fall, the work apparatus 1 continues to be situated in the normal state 10. In the normal state 10, no force acts on the housing 5. The housing 5 is not elastically deformed. In the case of an impact on a horizontal impact surface 30, the battery 4 is accelerated in the direction out of the battery shaft 6. A part of the force which results from this is absorbed by the locking element 14. In the case of its impact on the impact surface 30, the housing 5 is first of all deformed elastically in such a way that the battery 4 bears against the friction arrangement 15. The contact of the battery 4 is also brought about by virtue of the fact that the battery 4 moves further in the fall direction 40 after the first impact contact of the housing 5 on account of its mass inertia. The battery 4 slides a little on the friction arrangement 15 in the direction out of the battery shaft 6. Here, the battery 4 is braked by the friction arrangement 15. Here, the ribs of the friction arrangement 15 are deformed elastically. On account of the counter force which acts on the housing 5 in the case of the impact, in particular in the region of the impact region 23, the housing 5 is deformed elastically. On account of the arrangement of the reinforcing ribs 21 and 22, there is a type of pivot point for the deformation of the housing 5 in this region. In particular in the region which lies between the capture element 11 and the reinforcing ribs 21, 22 with regard to the removal direction 50, the housing 5 is deformed elastically in such a way that, in the impact state 20 of the work apparatus, the capture element prevents the movement of the battery 4 out of the battery shaft 6. In the impact state 20, the battery 4 bears with its edge region 33 against the capture element 11. The capture element 11 serves as a stop for the battery 4. The movement of the battery 4 out of the battery shaft 6 is stopped by the capture element 11 in this way. Here, the kinetic energy of the battery 4 is absorbed both by the locking elements 14 and by the friction arrangement 15, and by the capture element 11, and is dissipated into the housing 5. After the kinetic energy of the battery 4 and the energy which is released in the case of the impact of the housing 5 on the impact surface 30 are absorbed, the housing 5 springs back again into its original shape. The work apparatus 1 is then again situated in the normal state 10.

FIGS. 10 to 12 show a diagrammatic illustration of alternative embodiments for work apparatuses 1 with a battery shaft 6, in the case of which the disclosure is likewise used.

It is understood that the foregoing description is that of the preferred embodiments of the invention and that various changes and modifications may be made thereto without departing from the spirit and scope of the invention as defined in the appended claims.

The invention claimed is:

1. A portable handheld work apparatus comprising:

a tool;

an electric motor for driving said tool;

a battery for supplying power to said electric motor;

a housing defining a battery shaft for receiving said battery;

said battery shaft having a removal opening delimited by an edge;

said battery being delimited by an end face in a removal direction of said battery in a state wherein said battery is received into said battery shaft;

said end face being delimited, in a direction radially with respect to said removal direction, at least partially by an edge region of said end face;

said edge of said removal opening projecting in said removal direction beyond said edge region of said end face of said battery received in said battery shaft;

said work apparatus having a normal state wherein said battery is removable from said battery shaft in said removal direction through said removal opening;

said work apparatus having a temporary impact state which can occur in response to an impact of said housing onto an impact surface;

said work apparatus further including a capture element;

said capture element being arranged in a region of said edge of said removal opening;

wherein, in said normal state, said capture element is configured to permit removal of said battery from said battery shaft; and, said housing being configured to elastically deform so as to cause, in said impact state of said work apparatus, said capture element to prevent a movement of said battery out of said battery shaft because of the elastic deformation of said housing.

2. The portable handheld work apparatus of claim 1, wherein:

said capture element is configured by at least one part of said edge of said removal opening of said battery shaft of said housing; and, in said normal state, said capture element projects in a direction transversely with respect to said removal direction beyond a base body of said battery shaft in the direction toward said battery received in said battery shaft.

3. The portable handheld work apparatus of claim 1, wherein:

said capture element is configured by at least one part of said edge of said removal opening of said battery shaft of said housing; and, in the normal state, said capture element projects in a direction perpendicularly with respect to said removal direction beyond a base body of said battery shaft in a direction of the battery received in said battery shaft.

4. The portable handheld work apparatus of claim 1, wherein:

in the normal state of said work apparatus, said edge on said removal opening has a normal contour as viewed in a direction counter to said removal direction via said normal contour, said battery can be removed with said end face thereof at the front from said battery shaft through said removal opening in said removal direction;

in the temporary impact state, said removal opening has an impact contour as viewed in said direction counter to said removal direction; and, said impact contour is such that said movement of said battery in said direction of said removal opening is prevented because of said impact contour of said edge of said removal opening.

5. The portable handheld work apparatus of claim 4, wherein, in said impact state, said battery has an outer battery contour as viewed in said direction counter to said removal direction; and, said outer battery contour intersects said impact contour of said edge of said removal opening in a view in said direction counter to said removal direction.

6. The portable handheld work apparatus of claim 1, wherein, in said impact state, said capture element clamps in said battery.

7. The portable handheld work apparatus of claim 1, wherein said capture element is part of an outer wall of said housing.

8. The portable handheld work apparatus of claim 1, wherein said capture element is a rib of said housing; and, said rib runs at least partially around said removal opening and projects in said direction of said removal opening.

9. The portable handheld work apparatus of claim 1, wherein said portable handheld work apparatus has a locking element for releasable fastening of said battery in said battery shaft; and, in said temporary impact state, said battery is held in said battery shaft both by said locking element and by said capture element.

10. The portable handheld work apparatus of claim 1, wherein, in said temporary impact state, said battery bears with the edge region thereof against said capture element.

11. The portable handheld work apparatus of claim 1, wherein:

said portable handheld work apparatus falls in a fall direction before the impact with the impact surface in said temporary impact state;

said removal direction runs obliquely with respect to said fall direction and said removal opening points at least partially in said fall direction; and, said handheld work apparatus includes a brake arrangement arranged in said battery shaft in such a way that, in the event of said impact of said housing on said impact surface, said battery can slide on said brake arrangement in said direction of the capture element and at a same time can introduce forces into said housing in said fall direction.

12. The portable handheld work apparatus of claim 11, wherein, in said normal state of said portable handheld work apparatus, said brake arrangement is at a smallest radial spacing (r), measured perpendicularly with respect to said removal direction, from said battery at that location of said brake arrangement which is at a greatest spacing (d), measured in said removal direction from said capture element.

13. The portable handheld work apparatus of claim 11, wherein, in said normal state, said brake arrangement is arranged with regard to said removal direction in a half part lying closest to said removal opening.

14. The portable handheld work apparatus of claim 11, wherein, in the normal state, said brake arrangement is arranged with regard to said removal direction in a third part of said battery lying closest to said removal opening.

15. The portable handheld work apparatus of claim 11, wherein said brake arrangement includes at least two support ribs spaced apart from one another in said removal direction.

16. The portable handheld work apparatus of claim 15, wherein said at least two support ribs project in a direction transversely with respect to said removal direction beyond a base body of said battery shaft in said direction of said battery received in said battery shaft.

17. The portable handheld work apparatus of claim 11, wherein said brake arrangement includes at least three support ribs spaced apart from one another in said removal direction.

18. The portable handheld work apparatus of claim 11, wherein, in the region of the brake arrangement, said housing has a plurality of reinforcing ribs for absorbing forces transmitted from said brake arrangement to said housing.

19. The portable handheld work apparatus of claim 18, wherein said reinforcing ribs run from said brake arrangement in a direction of an impact region on an outer side of said housing, the impact region delimiting said housing in said fall direction.

20. The portable handheld work apparatus of claim 1, wherein said housing is free from reinforcing ribs in said region of said capture element so as to cause an elastic deformation of said housing in said region of said capture element.

21. The portable handheld work apparatus of claim 1, wherein said outer wall of said housing is free from reinforcing ribs in the region of said capture element so as to cause an elastic deformation of said housing in the region of said capture element.

* * * * *